A. McKILLOP.
WHEEL.
APPLICATION FILED JUNE 10, 1914.

1,124,934.

Patented Jan. 12, 1915.
2 SHEETS—SHEET 1.

WITNESSES
S. E. Wade.
Myron G. Clear.

INVENTOR
ANDREW McKILLOP
BY Munn & Co.
ATTORNEYS

A. McKILLOP.
WHEEL.
APPLICATION FILED JUNE 10, 1914.
1,124,934.
Patented Jan. 12, 1915.
2 SHEETS—SHEET 2.
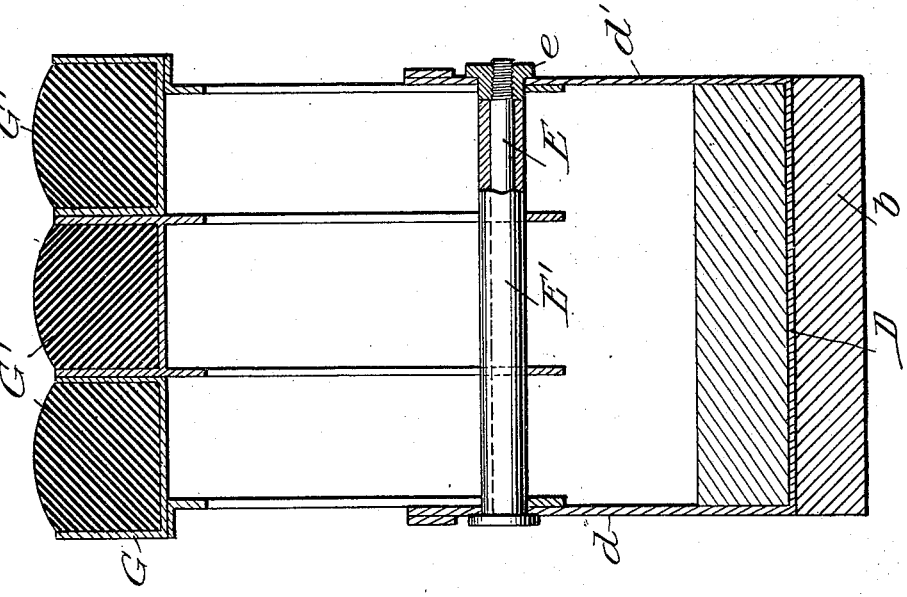
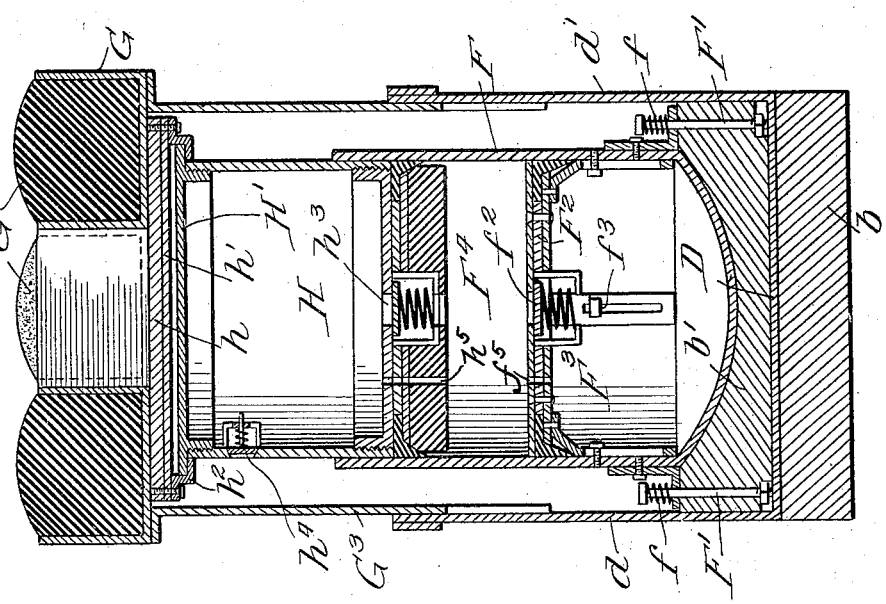
WITNESSES
S. E. Wade
Myron L. Clear
INVENTOR
ANDREW McKILLOP
BY Munn & Co.
ATTORNEYS

UNITED STATES PATENT OFFICE.

ANDREW McKILLOP, OF DOWNIEVILLE, CALIFORNIA.

WHEEL.

1,124,934.      Specification of Letters Patent.      Patented Jan. 12, 1915.

Application filed June 10, 1914. Serial No. 844,172.

*To all whom it may concern:*

Be it known that I, ANDREW McKILLOP, a citizen of the United States, and a resident of Downieville, in the county of Sierra and State of California, have invented an Improvement in Wheels, of which the following is a specification.

My present invention relates to vehicle wheels, and more particularly to an arrangement in which the tread portion of the wheel is elastically sustained in order to permit of its flexing with respect to the body of the wheel and to do away with the use of a pneumatic tire, the object of my invention being to provide a novel structure particularly with respect to the means for elastically supporting the tread portion of the wheel, whereby to form a strong and durable wheel of this character.

Figure 1:
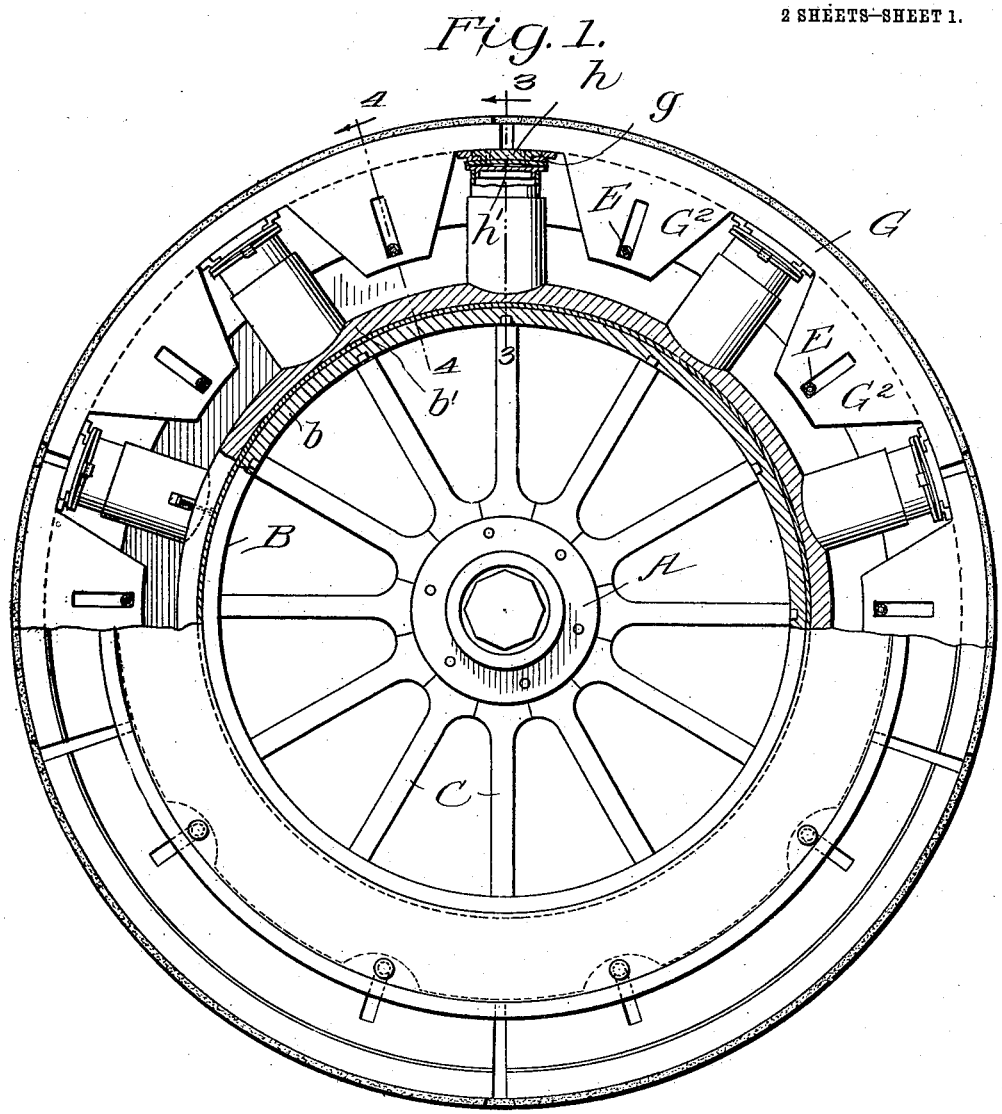
Figure 2:
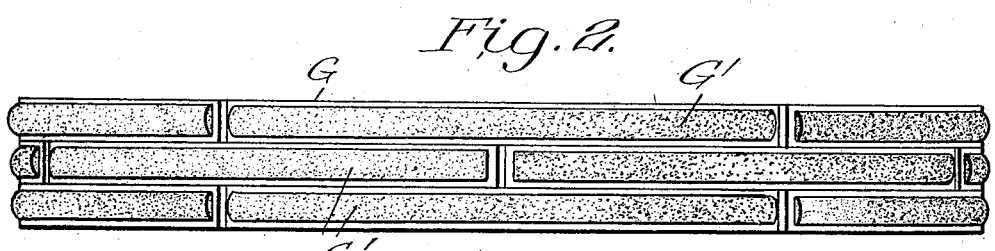

Other objects and the advantages resulting therefrom will be apparent from the following description in which reference is made to the accompanying drawings, forming a part of this specification, and in which, Figure 1 is a side elevation, partly broken away and in section, whereby to illustrate the interior construction. Fig. 2 is a plan view of the wheel illustrating the arrangement of the tread blocks. Fig. 3 is a radial section through the rim portion of the wheel taken substantially on line 3—3 of Fig. 1, and Fig. 4 is a similar view taken substantially on line 4—4 of Fig. 1.

Referring now to these figures, the hub portion A of my improved wheel is connected to the felly B by means of radial spokes C which may be connected to the parts in the usual manner or as desired, it being noted, particularly from Figs. 3 and 4 that the felly consists of inner and outer portions $b$ and $b'$ respectively between which is carried the body portion D of a felly plate having outwardly projecting side plates $d$ and $d'$.

These plates $d$ and $d'$ are provided at points beyond the felly B, with a circular series of equidistantly spaced and opposing apertures through which are extended transverse guide bolts E, each of which bolts is headed at one end and is provided with an intermediate sleeve E' against one end of which sleeve the confining nut $e$ threaded upon the opposite end of the bolt abuts.

It will be noted by particular reference to Figs. 1 and 3 that the outer portion $b'$ of the felly is provided with a plurality of concave seats suitably spaced therearound and within which are seated the inner ends of radial piston cylinders F. Each of these piston cylinders, as particularly shown in Fig. 3 is loosely held in its seat by bolts F' around which are coiled springs $f$. Within each piston cylinder is arranged a movable partition $F^2$ forming a pressure controlled piston and provided with a central valve $f^2$ and guides $f^3$, it being noted that this partition divides the piston cylinder into inner and outer compartments $F^3$ and $F^4$ respectively.

The tread of my improved wheel consists of a plurality of curved elongated tread blocks G arranged to break joint with one another and each provided with an individual solid cushion G' and with inward projections $G^2$ having slots extending radially of the wheel and through which the bolts E extend, it being noted that these tread blocks are formed from sheet metal and that the inward projections $G^2$ are extensions of the sides thereof. It will be also noted that the outer side portions $G^3$ of the outer tread blocks are extended inwardly around the entire wheel, forming guides slidable along the inner faces of the side felly plates $d$ and $d'$ and coöperating therewith. Between their inner projections $G^2$ the central tread blocks G have transverse guide strips $g$ spaced apart and adapted to receive the transverse side edges of top plates $h$ to which are attached piston carrying plates $h'$, these latter plates having side guide strips $h^2$ extending in the direction of the circumference of the wheel to receive the flanged covers H' of the several cylindrical pistons H. This structure is best seen by reference to and comparison of Figs. 1 and 3.

Each of the pistons H is cylindrical in form and is provided in its lower or inner end which projects within the outer chamber $F^4$ of its respective cylinder F, with a valve $h^3$ which like the valves $f^2$ of the cylinder partition $F^2$, consists of a plate seated by means of a spring and outwardly against and around the opening which it is designed to cover. By reference to Fig. 3 it will also be seen that the wall of each of the cylindrical pistons H is provided with an aperture covered by a spring controlled outwardly seated valve $h^4$. It will thus be seen by particular reference to Fig. 1, that inasmuch as each of the tread blocks has three bearing points controlled by as many pistons and cylinders, the elastic support of the wheel will be distributed equally throughout the entire series of tread blocks. Referring to the particular construction of the pistons and cylinders it will further be seen that when, under pressure, the cylindrical piston H is thrust inwardly, air from the chamber $F^4$ of the cylinder F will be forced into the inner chamber $F^3$ through the partition valve $f^2$ and when the piston moves outwardly, air within chamber $F^4$ is augmented by a supply through the piston valves $h^4$ and $h^3$. The pressure controlled piston $F^2$ has a limited movement to the extent of its guides $f^3$ and moves outwardly each time the piston H moves inwardly, due to the forced pressure of air within the chamber $F^3$. In this way an effective cushion is formed within the chamber $F^4$ when no more air can be forced into chamber $F^3$, and which cushion is variable and depends upon the pressure exerted to force the operating piston H inwardly. Furthermore the pressure of air within the chamber $F^4$ serves to return the tread blocks to normal position after each movement thereof under the load. It is to be understood, however, that both the inner end of the pistons H and the movable partition $F^2$ are provided with minute openings $h^5$ and $f^5$ respectively, in order to relieve the chambers $F^3$ and $F^4$ and prevent such accumulation of pressure therein as would otherwise render the device non-resilient and therefore ineffective.

Thus from the foregoing it will be seen that I provide a spring wheel adapted to operate with equal facility in connection with light and heavy vehicles of various sizes and styles, and one in which maximum elasticity may be had without sacrificing the natural strength of the parts utilized.

I claim:

1. A spring wheel comprising the combination of a hub portion, a rigid frelly carried by the hub portion, a sectional tread movable relatively to the felly, means for guiding and limiting the relative movement of the tread, and radially disposed piston cylinders and pistons between and in engagement with the felly and tread portions, each of which pistons is provided in its wall and in its inner end with inwardly opening valves, and a pressure controlled piston having a limited movement within each cylinder and provided with a valve, the pressure controlled piston being arranged between the valved end of the main piston and the inner closed end of the cylinder, all for the purpose described.

2. A spring wheel having a rigid felly and a relatively movable tread consisting of a plurality of tread blocks each of which has a solid tread cushion, the said blocks being arranged to break joint with one another, means for guiding and limiting the relative movements of the tread with respect to the felly, and piston cylinders and pistons extending radially between the felly and the tread whereby to cushion their relative movement, said pistons having valves in their walls and inner ends and said cylinders having pressure controlled valves therein between their inner ends and the inner ends of the pistons, substantially as described.

ANDREW McKILLOP.

Witnesses:
JOHN HORWEGE,
MILES G. CALVIN.

Copies of this patent may be obtained for five cents each, by addressing the "Commissioner of Patents, Washington, D. C."